(12) United States Patent (10) Patent No.: US 8,060,091 B2
Göransson (45) Date of Patent: Nov. 15, 2011

(54) TRANSFER RATE MEASUREMENTS

(75) Inventor: Bo Göransson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1073 days.

(21) Appl. No.: 11/795,141

(22) PCT Filed: Feb. 7, 2005

(86) PCT No.: PCT/SE2005/000152
§ 371 (c)(1),
(2), (4) Date: Jul. 12, 2007

(87) PCT Pub. No.: WO2006/083201
PCT Pub. Date: Aug. 10, 2006

(65) Prior Publication Data
US 2008/0107163 A1    May 8, 2008

(51) Int. Cl.
*H04W 36/00* (2009.01)
*H04W 4/00* (2009.01)
(52) U.S. Cl. .................. 455/436; 455/437; 370/334
(58) Field of Classification Search .......... 455/436–439; 370/334
See application file for complete search history.

(56) References Cited

U.S. PATENT DOCUMENTS

| 4,718,081 A * | 1/1988 | Brenig ........................... 455/438 |
| 5,889,768 A * | 3/1999 | Storm et al. .................. 370/320 |
| 6,067,324 A | 5/2000 | Harrison |
| 6,115,406 A | 9/2000 | Mesecher |
| 6,373,877 B1 | 4/2002 | Mesecher |
| 6,917,821 B2 * | 7/2005 | Kadous et al. ............. 455/562.1 |
| 2003/0043946 A1 * | 3/2003 | Kim et al. ..................... 375/358 |

FOREIGN PATENT DOCUMENTS

| EP | 1 501 231 A1 | 1/2005 |
| JP | 2004-023774 | 1/2004 |
| KR | 2002-0031694 | 5/2002 |
| TW | 200302652 A | 8/2003 |
| TW | 595151 | 6/2004 |
| WO | 03041300 A1 | 5/2003 |

OTHER PUBLICATIONS

TW Search Report completed Dec. 5, 2008 in corresponding TW application 095103911.
English translation of TW Office Action mailed Jun. 23, 2009 in corresponding TW application 095103911.
International Search Report for International Application No. PCT/SE2005/000152, mailed Sep. 29, 2005.
Chinese Office Action mailed Mar. 1, 2010 in corresponding CN application 200580047836.6.

* cited by examiner

*Primary Examiner* — Jinsong Hu
*Assistant Examiner* — Marisol Figueroa
(74) *Attorney, Agent, or Firm* — Nixon & Vanderhye, P.C.

(57) ABSTRACT

An apparatus in a radio terminal (MS) determines a measure representing transfer rate from a radio cell to the terminal. The apparatus includes units (SINR-1, . . . , SINR-4) for determining several signal quality measures of pilot signals received from and associated with several antennas in the radio cell. A summation unit (SUM) combines several such signal quality measures into a combined transfer rate measure associated with the radio cell. Such combined measures are determined for several radio cells surrounding the terminal. Further means (MEN, SEL, TH) select radio cells associated with combined transfer rate measures that support a predetermined transfer rate as candidates for communication with the terminal. The selected measures are reported to the radio network controller and used for cell selection or handover.

4 Claims, 4 Drawing Sheets

TRANSFER RATE MEASUREMENTS

This application is the US national phase of international application PCT/SE2005/000152, filed 7 Feb. 2005, which designated the US, the entire contents of which are hereby incorporated by reference.

TECHNICAL FIELD

The present invention relates generally to radio communication, and especially to improved measurement principles for cell selection and handover in MIMO (Multiple Input Multiple Output) radio communication systems.

BACKGROUND

In current radio communication systems, such as WCDMA (Wideband Code Division Multiple Access), cell selection and handover reporting are based on pilot measurements, such as SIR (Signal to Interference Ratio). The terminal is measuring the quality of e.g. the common pilot of a radio cell and this value is regularly reported to the RNC (Radio Network Controller), which then can take decisions on actions, such as adding or removing handover legs. In HSDPA (High Speed Downlink Packet Access) this type of measurement is also used for e.g. fast cell selection, i.e., the terminal can instantaneously connect to the base station that provides the "best" channel.

If and when multi-antenna systems such as MIMO (Multiple Input Multiple Output) are applied to e.g. HSDPA a single measurement as described above does not provide enough information to the system for optimal cell selection or handover. If several antennas are used at the base station and the common pilot is transmitted from a specific antenna, all quality measurements will reflect the potential transmission quality of that antenna only.

SUMMARY

An advantage of the technology disclosed herein is a method and apparatus for determining a more accurate measure representing transfer rate from a radio cell to a terminal in a MIMO system.

Another advantage is a cell selection support method and apparatus based on such measures.

Still another advantage is a handover support method and apparatus based on such measures.

Briefly, the technology disclosed herein comprises determining and combining, in a radio terminal, signal quality measures of pilot signals received from and associated with several antennas in a radio cell. Such combined measures from several radio cells are compared, and the radio cells associated with the best measures are used as candidates for cell selection or handover.

BRIEF DESCRIPTION OF THE DRAWINGS

The technology disclosed herein, together with further objects and advantages thereof, may best be understood by making reference to the following description taken together with the accompanying drawings, in which.

DETAILED DESCRIPTION

Figure 1:
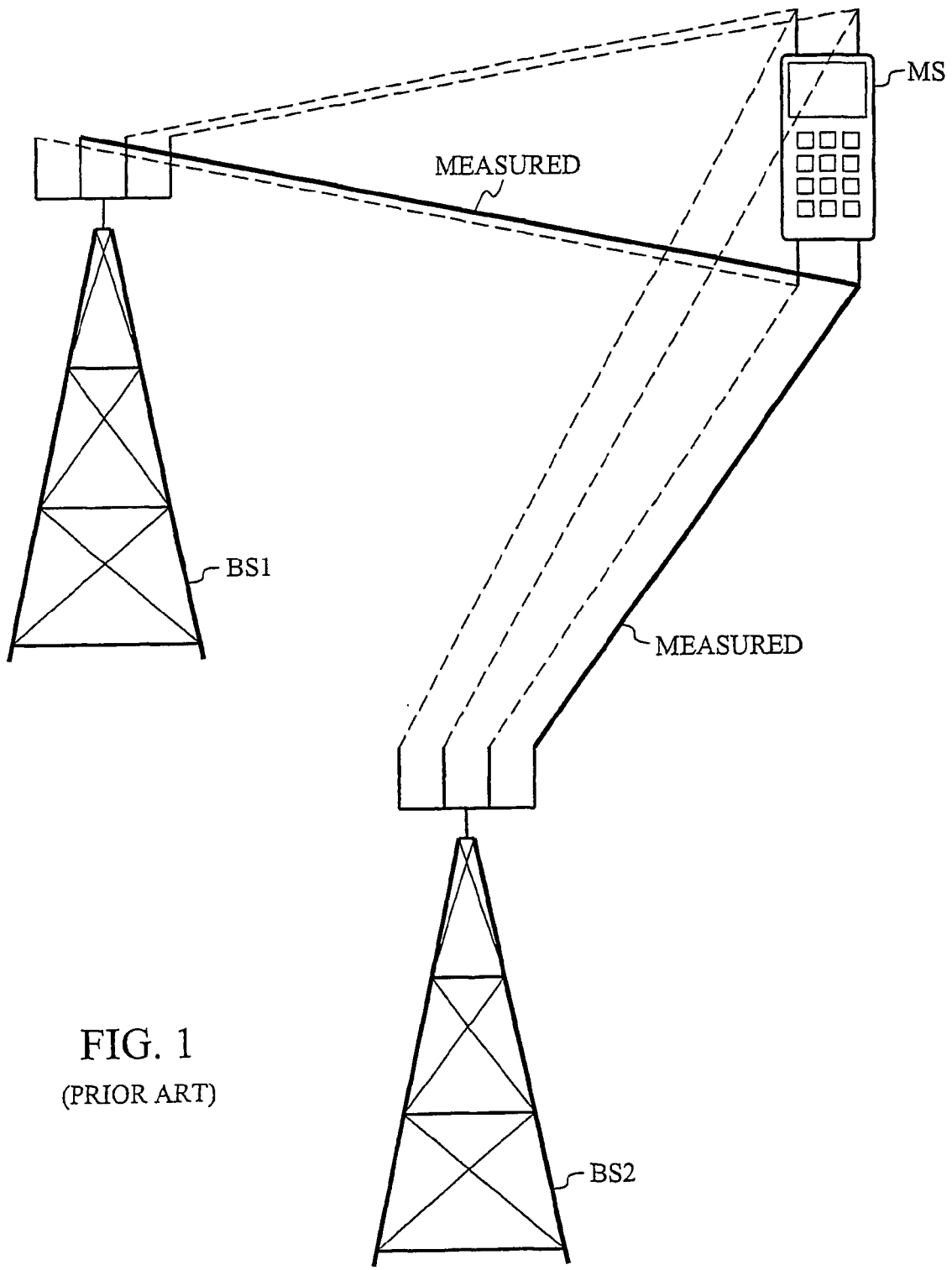
FIG. 1 illustrates a typical prior art radio communication system.

FIG. 1 illustrates a typical prior art radio communication system. A radio terminal MS is performing measurements for cell selection or handover on two different base stations BS1, BS2. These measurements are performed on one radio terminal antenna as indicated by the solid lines from the base stations to the mobile.

However, for a MIMO system the combined quality of all, or at least several, of the transmit antennas will contribute to the overall transmission capacity of a particular link. Thus, for such systems the prior art measurements are unreliable. For example, in a system with 4 transmit antennas at the base station side with the traditional common pilot transmitted from a pre-selected antenna, only the quality on this link will be used for cell selection or handover. However, it might happen that this link is in a deep fade towards base station BS1, and thus this leg will not be included in the handover set regardless of the quality towards all other antennas at base station BS1. The common pilot from the pre-selected antenna of base station BS2 might show a very high quality, and thus this link is added to the handover set even if the signal quality to the other antennas of base station BS2 is very poor.

Figure 2:
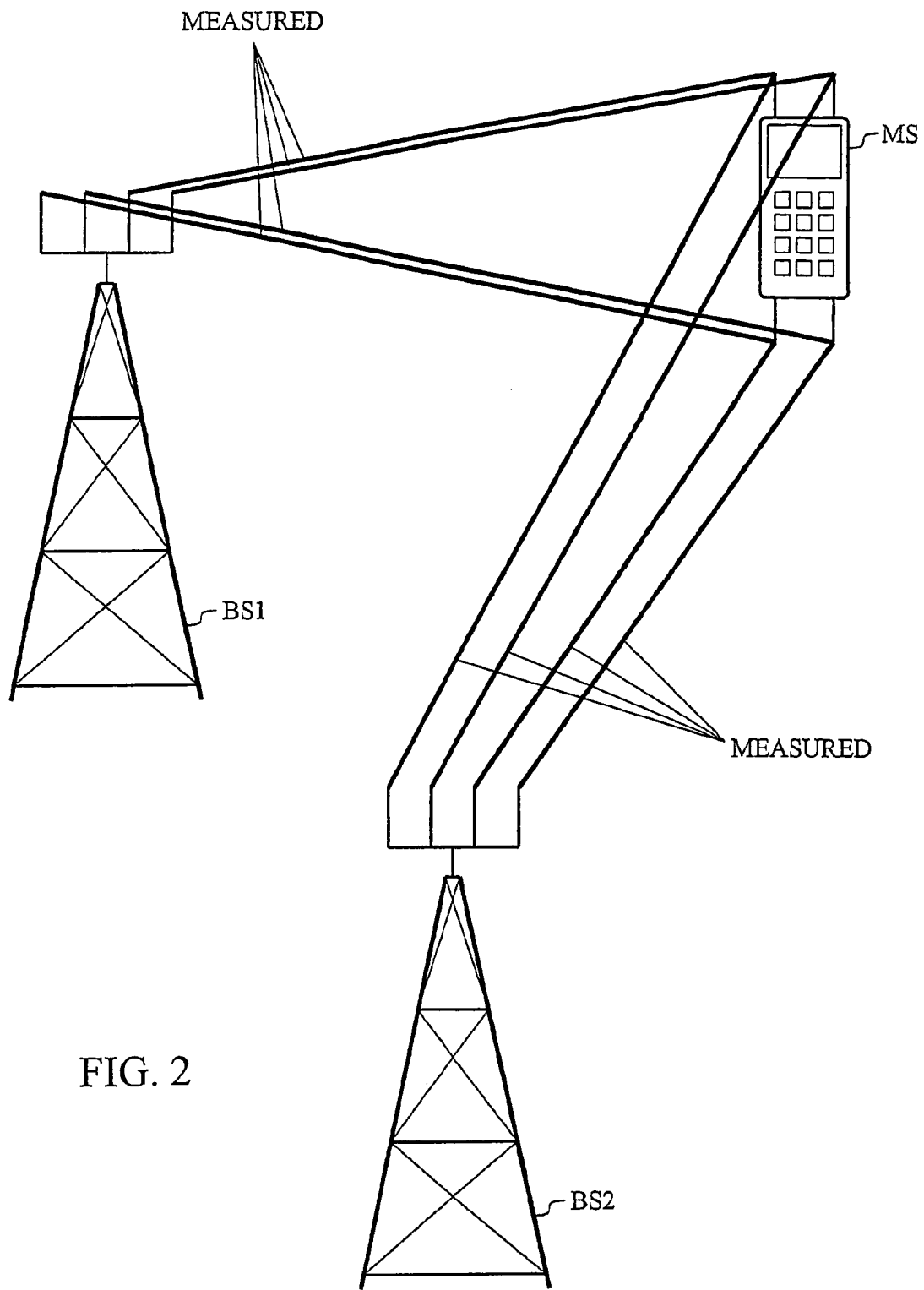
FIG. 2 is similar to FIG. 1, but illustrates the basic principles of the technology disclosed herein.

FIG. 2 is similar to FIG. 1, but illustrates the basic principles of the technology disclosed herein. Terminal MS now estimates the maximal supported data rate from all, or at least several, transmit antennas (as indicated by the solid lines), thereby reflecting the true capacity of the combined channel. Thus, the according to the technology disclosed herein the radio terminal should use the pilots transmitted from all (or at least several) antennas to estimate, for example, the total transmission rate that can be decoded with a certain probability. This quantity is estimated for all cells that are within reach for the specific terminal and reported to the system. The system, e.g. the base station or RNC (Radio Network Controller) can then make the appropriate decision on cell selection and handover that maximizes the rate for a given terminal.

Figure 3:
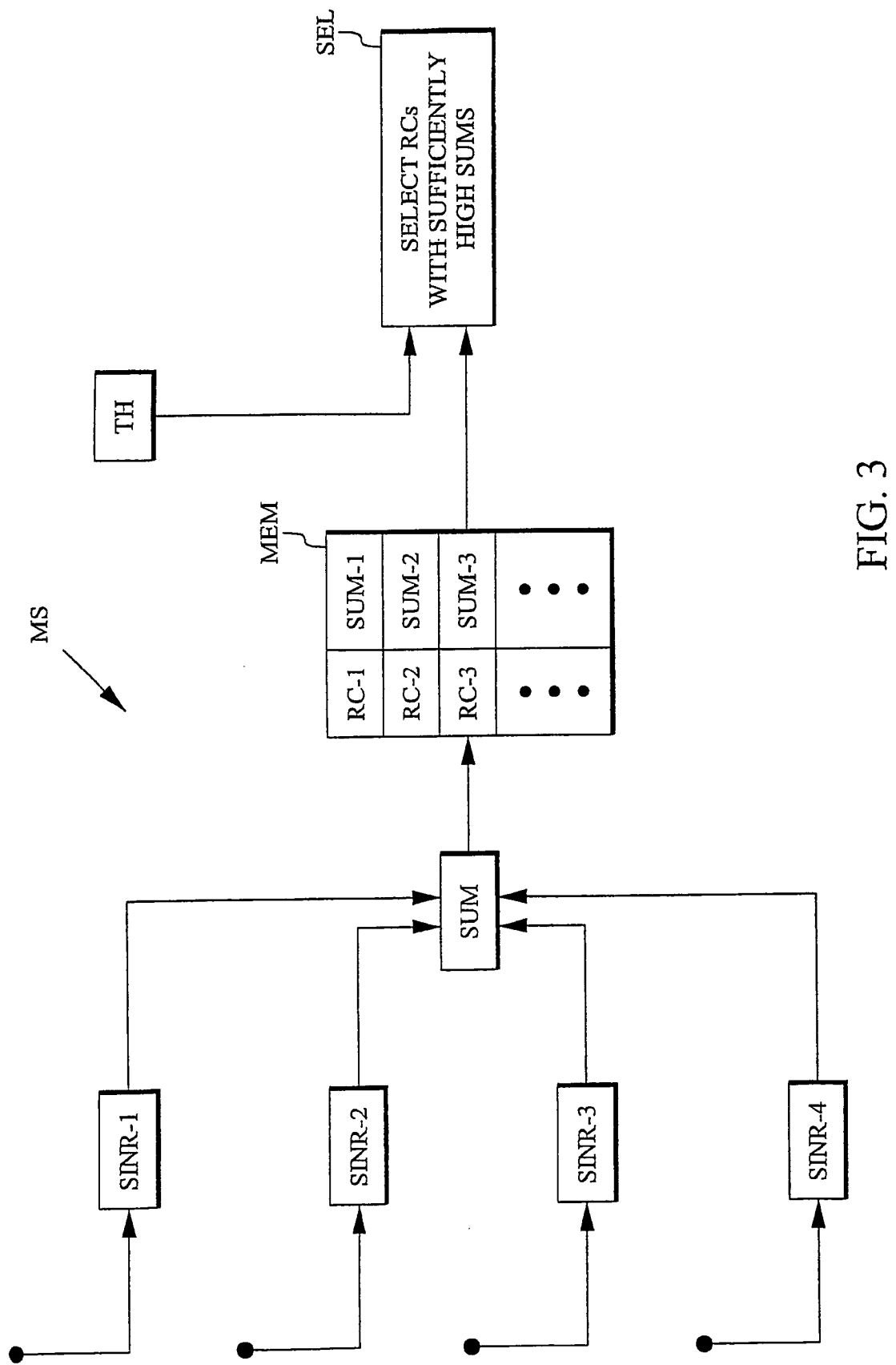
FIG. 3 is a simplified block diagram of a radio terminal including an example embodiment of a support apparatus in accordance with the technology disclosed herein.

FIG. 3 is a simplified block diagram of a radio terminal including an embodiment of an apparatus in accordance with the technology disclosed herein. In order to avoid cluttering of the figure, only elements that are needed to explain the technology disclosed herein are included. Each radio terminal antenna is associated with a unit SINR-1, . . . , SINR-4 measuring the corresponding SINR (Signal to Interference plus Noise Ratio). These measurements are combined into a combined transfer rate measure in a summation unit SUM. The measurement procedure is repeated for all monitored radio cells RC-1, RC-2, . . . , and the resulting combined measures SUM-1, SUM-2, . . . together with the cell identifiers are stored in a memory MEM (for example implemented as a queue). A selection unit SEL selects the measures that are sufficiently high to support a predetermined target transfer rate by comparing the combined measures in memory MEM to a predetermined threshold TH. These radio cells and their associated combined measures are reported to the RNC for cell selection/handover.

The various units in the described embodiment of the technology disclosed herein are typically implemented by a microprocessor, a digital signal processor or a signal/micro processor combination and corresponding software, However an ASIC (Application Specific Integrated Circuit) is also feasible.

In the described embodiment the sum of measured SINR values from different antennas was used as a combined measure of transfer rate. Other possible measures are, for example, max SINR, sum SIR, max SIR, channel capacity, signal strength, etc. Another example is CQI (Channel Quality Indicator). This technique may report an MCS (Modulation Coding Scheme), which, if used, enables decoding of data with a predetermined block error rate, for example 10%.

Furthermore, in the described embodiment it was assumed that the radio terminal had the same number of antennas as the base stations. However, this is not a requirement of the technology disclosed herein. For example, if the terminal has fewer antennas than a base station, the terminal may determine combined measures of different combinations of antennas.

In the embodiment illustrated in FIG. 3 there was a unit measuring SINR associated with each terminal antenna. However, it is also possible to use a single unit and switch this unit between the antennas.

In order to simplify the above description, it has been assumed that each base station (radio cell) is associated with a unique pilot signal that is the same for all antennas of the base station. However, although this is convenient for describing the basic concepts, it is not strictly necessary for practicing the technology disclosed herein. What is necessary is that the used pilot signals are known to the terminal and that the terminal is also aware of which pilot is associated with which base station. It would, for example, also be possible to associate each antenna in a base station with a unique pilot. Each of these pilots would, however, still be associated with the same radio cell.

Figure 4:
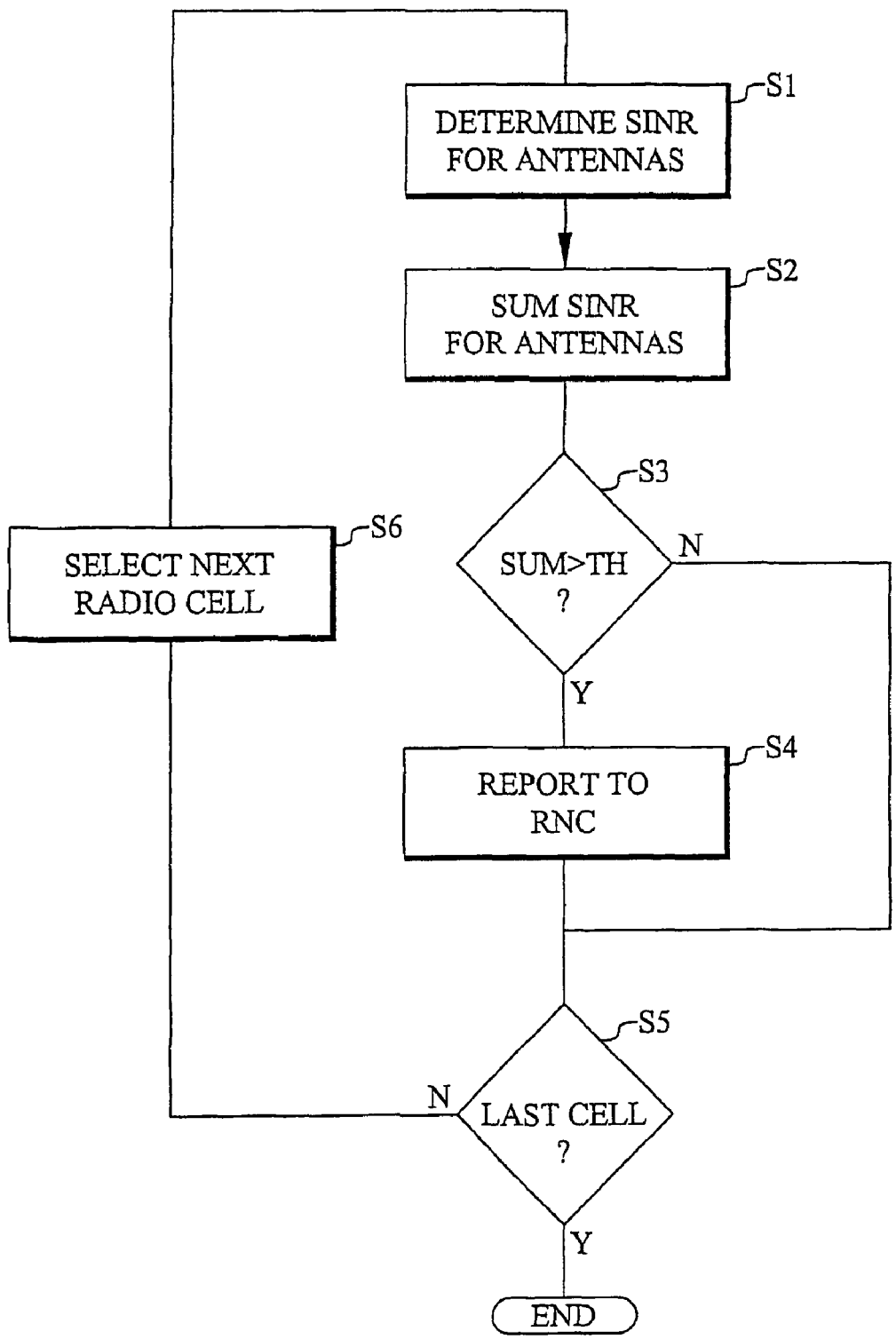
FIG. 4 is a flow chart illustrating an example embodiment of the support method in accordance with the technology disclosed herein.

FIG. 4 is a flow chart illustrating an embodiment of the method in accordance with the technology disclosed herein. Step S1 determines SINR (or another measure, as described above) for different antennas of a radio cell. Step S2 combines these SINR values into a measure representing the supported total transfer rate characterizing the cell. Step S3 determines whether this measure exceeds a predetermined threshold TH. If the measure exceeds the threshold, step S4 reports the measure and a corresponding cell identifier to the RNC. The procedure then continues to step S5. If the measure does not exceed the threshold, the procedure continues directly from step S3 to step S5. Step S5 determines whether this is the last radio cell to monitor. If this is the case, the procedure ends (the procedure may of course be repeated at a later time). If this was not the last radio cell, the procedure selects the next cell in step S6 and wraps back to step S1.

An advantage of the described technology is that the system can base e.g. handover and/or cell selection on the actual total quality of the link and not only the quality between one antenna pair as in the prior art. Another advantage is that the technology disclosed herein is adaptable to receiver performance. Since e.g. the sum rate is used as a parameter, this means that terminals with different receiver implementations (for example a different number of antennas) can have different active sets even if they are located at the same geographical spot.

It will be understood by those skilled in the art that various modifications and changes may be made to the present invention without departure from the scope thereof, which is defined by the appended claims.

The invention claimed is:

1. A radio cell selection support method for a radio terminal surrounded by several radio cells, the method comprising:
    determining, in said radio terminal, several signal quality measures of pilot signals received from and associated with several antennas in a radio cell; and
    combining several such signal quality measures of the several antennas into a combined transfer rate measure associated with said radio cell; and
    selecting radio cells associated with combined transfer rate measures that support a predetermined transfer rate as candidates for communication with said terminal.

2. A handover support method for a radio terminal surrounded by several radio cells, the method comprising:
    determining, in said radio terminal, several signal quality measures of pilot signals received from and associated with several antennas in a radio cell; and
    combining several such signal quality measures of the several antennas into a combined transfer rate measure associated with said radio cell; and
    selecting radio cells associated with combined transfer rate measures that support a predetermined transfer rate as candidates for future communication with said terminal.

3. A radio cell selection support apparatus in a radio terminal surrounded by several radio cells, said apparatus including:
    means for determining several signal quality measures of pilot signals received from and associated with several antennas in a radio cell;
    means for combining several such signal quality measures of the several antennas into a combined transfer rate measure associated with said radio cell; and,
    means for selecting radio cells associated with combined transfer rate measures that support a predetermined transfer rate as candidates for communication with said terminal.

4. A handover support apparatus in a radio terminal surrounded by several radio cells, said apparatus including:
    means for determining several signal quality measures of pilot signals received from and associated with several antennas in a radio cell;
    means for combining several such signal quality measures of the several antennas into a combined transfer rate measure associated with said radio cell; and
    means for selecting radio cells associated with combined transfer rate measures that support a predetermined transfer rate as candidates for future communication with said terminal.

* * * * *